Figure 1:
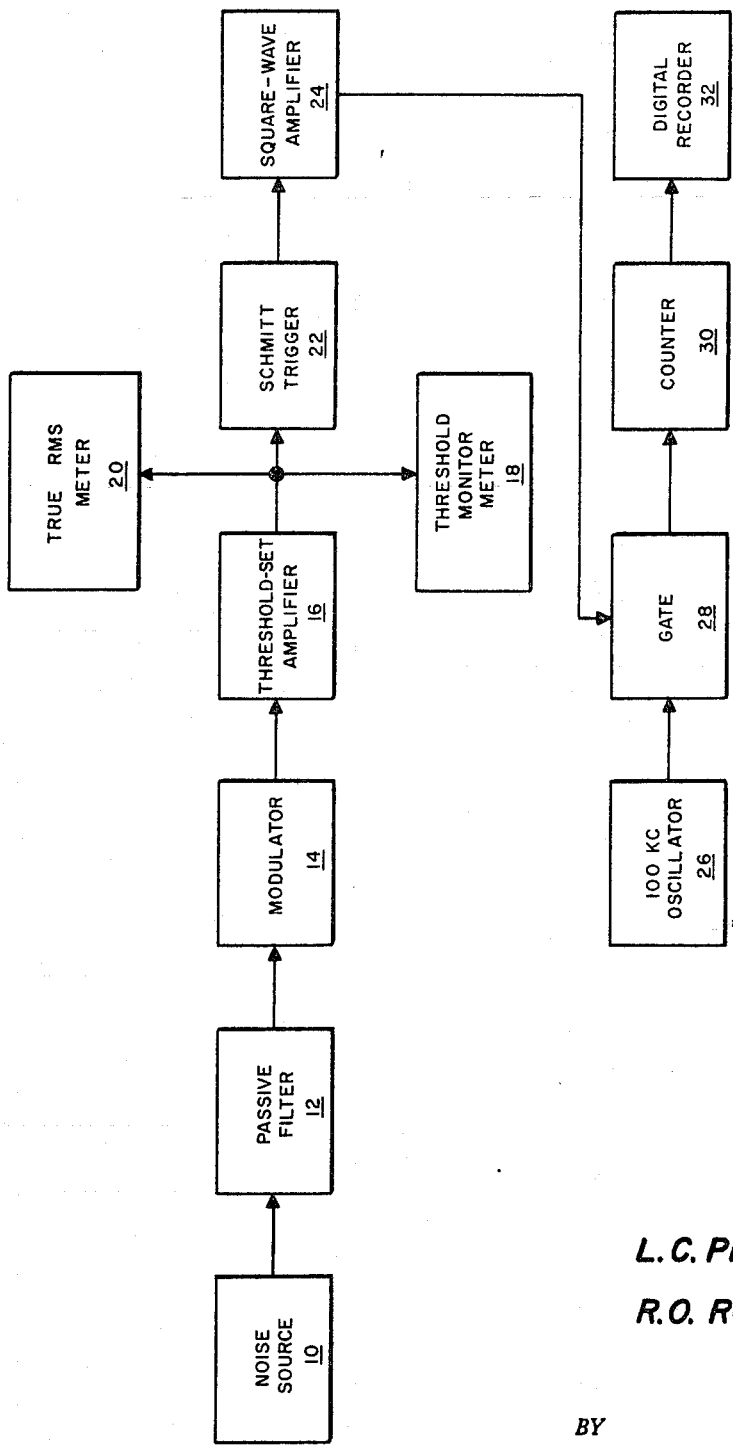

Dec. 6, 1966 L. C. PHARO, JR., ET AL 3,290,592
METHOD FOR MEASURING AND UTILIZING THE CUMULATIVE
PROBABILITY DISTRIBUTION OF A PREDETERMINED
SIGNAL PORTION OF NOISE
Filed Dec. 9, 1963 5 Sheets-Sheet 1

FIG. I

L. C. PHARO, JR.
R. O. ROWLANDS
INVENTORS

BY

ATTORNEY

L.C. PHARO, JR.
R.O. ROWLANDS
INVENTORS

L. C. PHARO, JR.
R. O. ROWLANDS
INVENTORS

BY
*V.C. Mueller*
ATTORNEY

L.C. PHARO, JR.
R.O. ROWLANDS
INVENTORS

BY

ATTORNEY 3,290,592
METHOD FOR MEASURING AND UTILIZING THE CUMULATIVE PROBABILITY DISTRIBUTION OF A PREDETERMINED SIGNAL PORTION OF NOISE
Lawrence C. Pharo, Jr., and Richard O. Rowlands, State College, Pa., assignors, by mesne assignments, to the United States of America as represented by the Secretary of the Navy
Filed Dec. 9, 1963, Ser. No. 329,329
2 Claims. (Cl. 324—77)

This invention relates to noise measuring devices and in particular to a method of measuring the cumulative probability distribution of random noises or oscillatory electric signals.

The study of the various parameters of noise is necessary in many fields such as information theory, communications, cryptography, acoustic target detecting systems, and so on. The determination of the cumulative probability distribution of a noise is one of the basic methods of describing a noise. The term "cumulative probability distribution" is an abbreviated way of saying the measure of the percent of time which a signal remains above a selected level. One example of a particular type of noise would be Gaussian noise. Another would be Rayleigh noise. These, and other spurious electric signals can be described by reference to the respective cumulative probability distribution.

For example, it is known that the ocean generates much noise and it is suspected that this noise follows a Gaussian distribution. If a foreign object such as a ship were to also be present nearby, the noise which is picked up through a hydrophone positioned in the ocean, would no longer be pure Gaussian. In addition to the usual ocean noise, a periodic noise such as a sine wave generated by the ship might be present also. Therefore, it would be a relatively simple matter to detect a ship by comparing the probability distribution of the modified ocean noise with the known probability distribution of Gaussian noise. Another application of this invention would be the determination of the type of noise pick-up which is inherent in any type of wire communication. By determining the probability distribution of the pick-up noise, it might be possible to design a filter to enhance the detectability of the desired information.

In recent years the desire for this knowledge has focused upon the statistical methods of investigating noise characteristics. Several investigators have made extensive mathematical surveys of the subject; however, from a practical point of view, there is need for relatively simple methods of accurately measuring such parameters as amplitude distribution. The amplitude distribution of a complex noise signal is usually obtained by measuring the distribution of the noise signal at various threshold levels throughout the amplitude of the signal.

Prior art shows that measurement of the cumulative probability distribution of Gaussian noise usually results in a signal display on the cathode ray tube face and this display must be physically measured. Results obtained by this method are questionable since the accuracy of the measurement is a function of the size of the cathode ray tube trace which is often broad and gives opportunity for inaccurate interpretation. The problem of measuring the cumulative probability distribution of a noise has been approached from many different directions but, heretofore, there was no quick, simple and accurate method of analysis known. The method and apparatus herein disclosed is highly accurate yet uncomplicated. The information desired is produced as a number and is not subject to human error through measurement or interpretation. The simplicity of the system makes it immediately apparent that the physical size of the apparatus is quite small.

Figure 2:
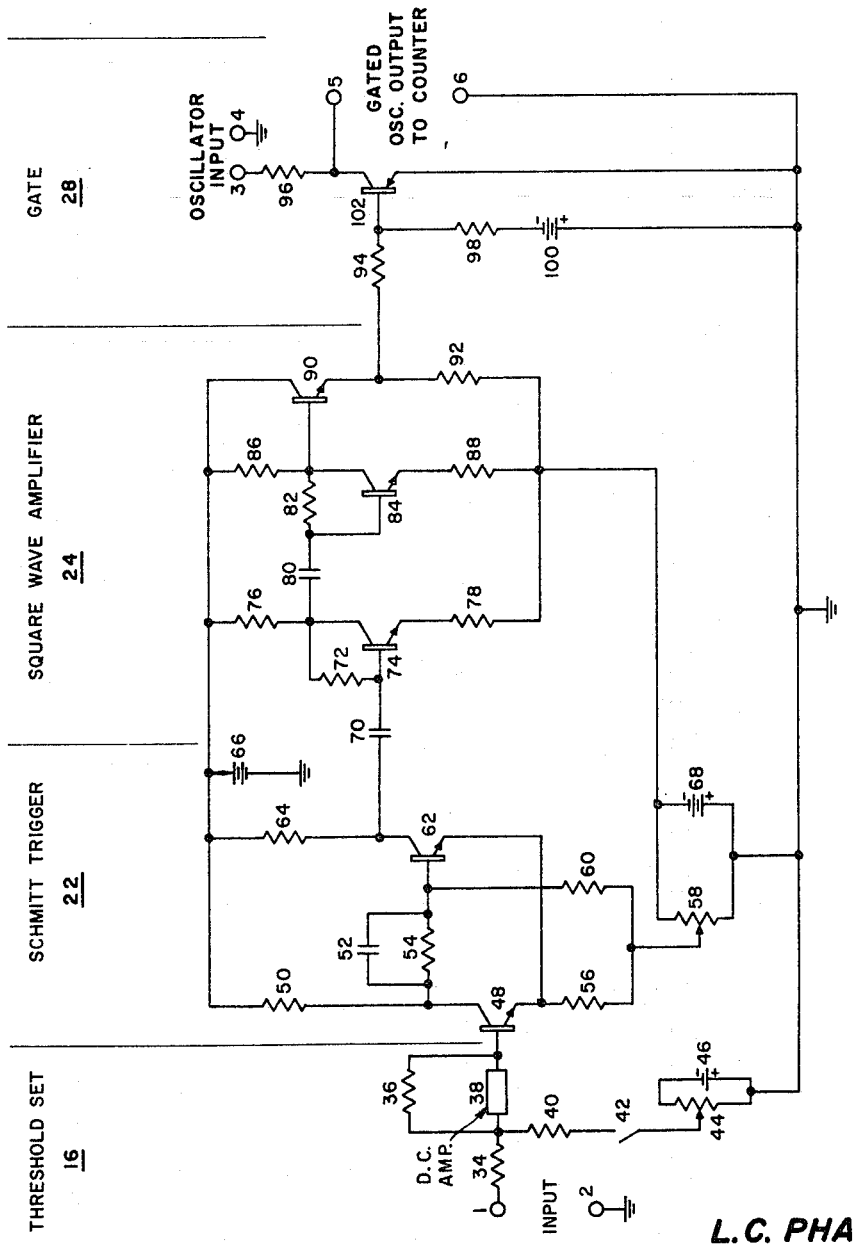
Figure 3:
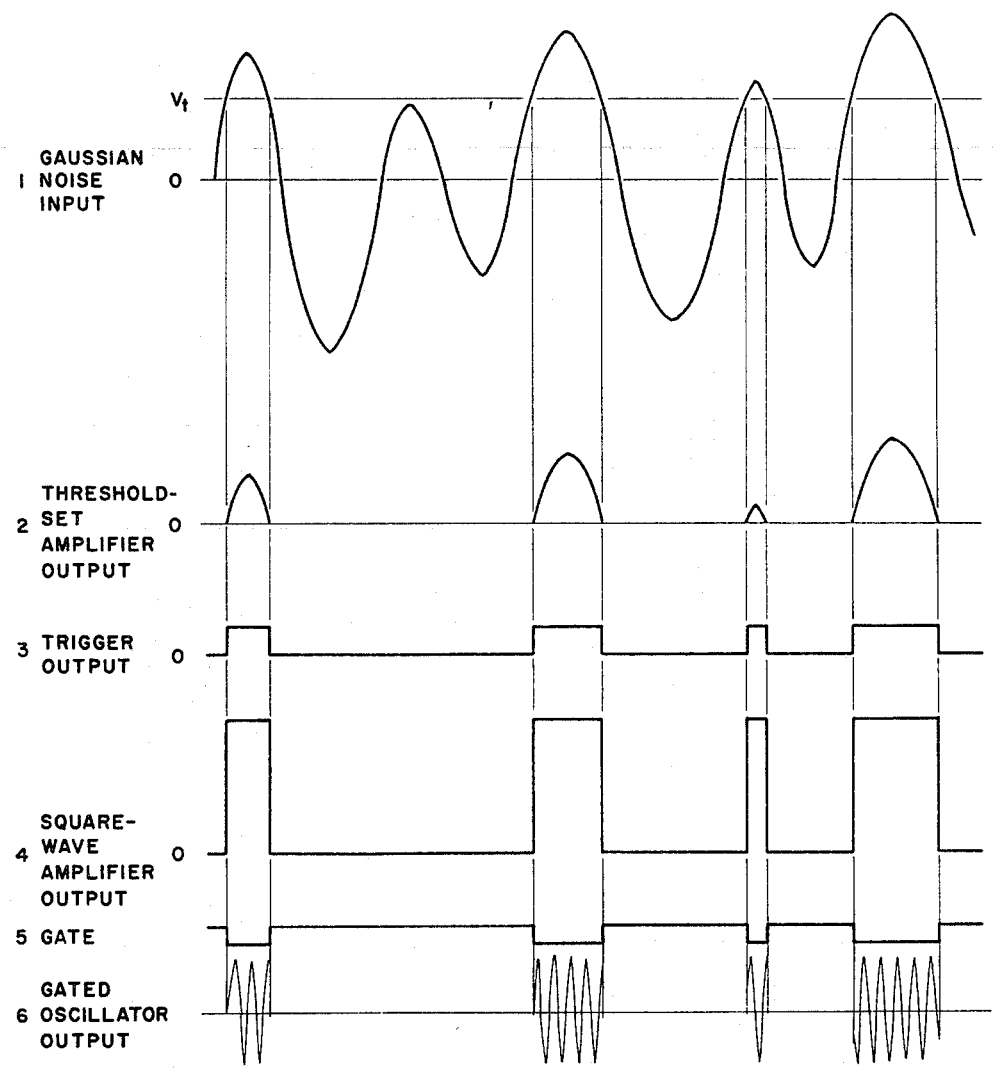
Figure 4:
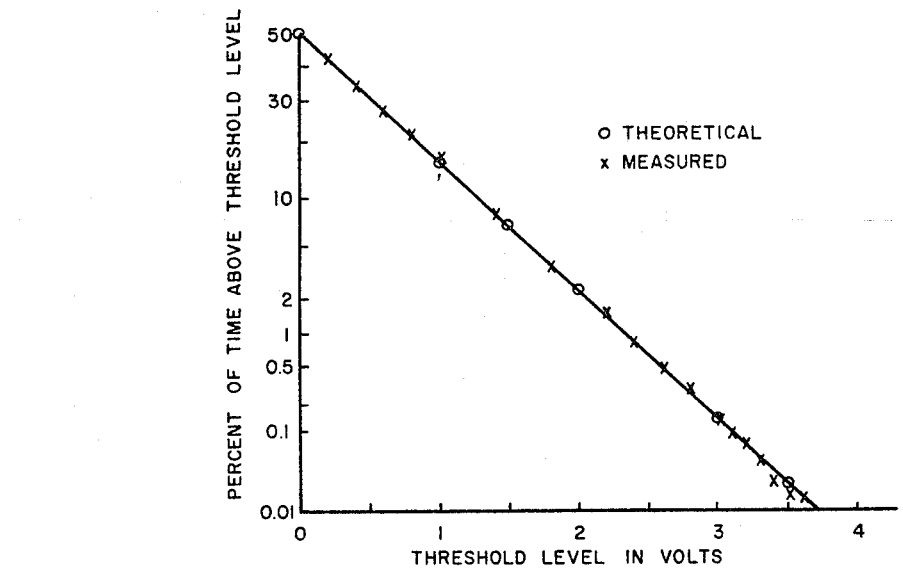
Figure 7:
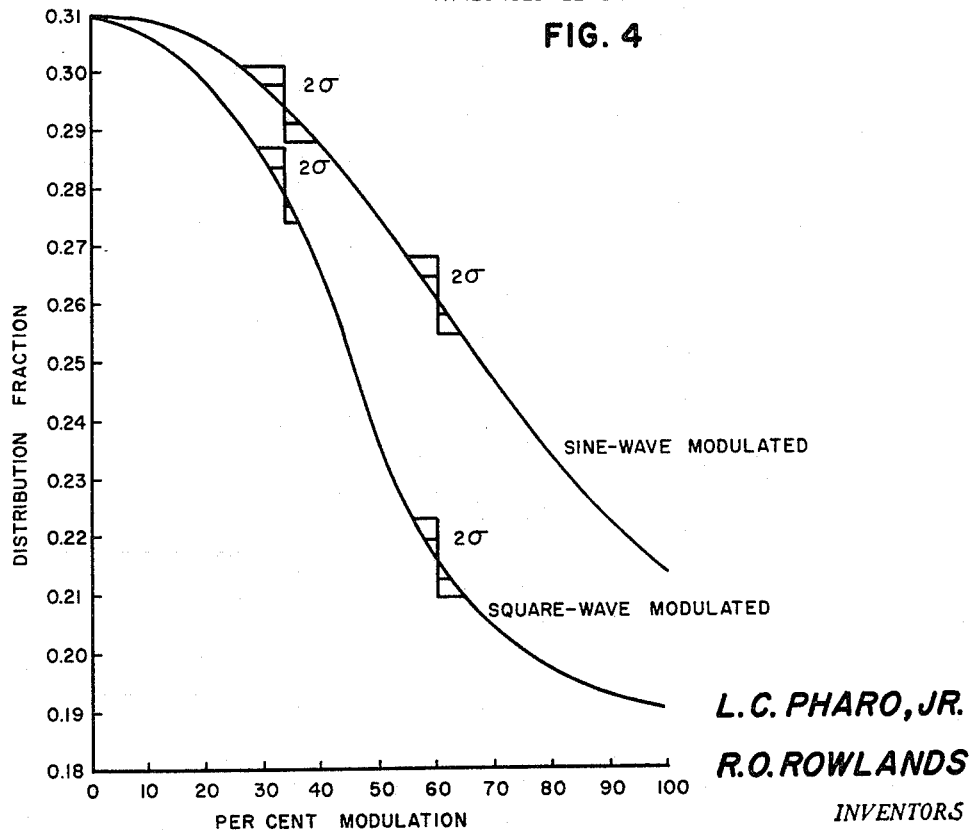
Figure 6:
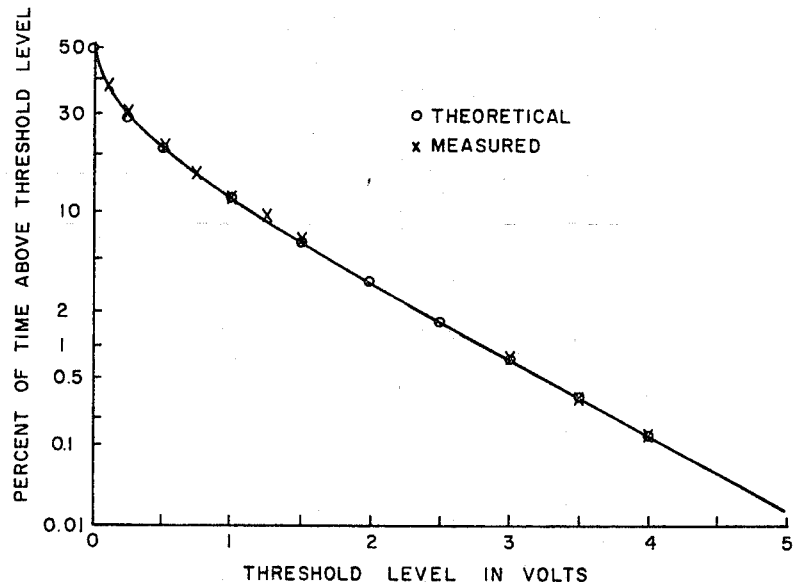
Figure 5:
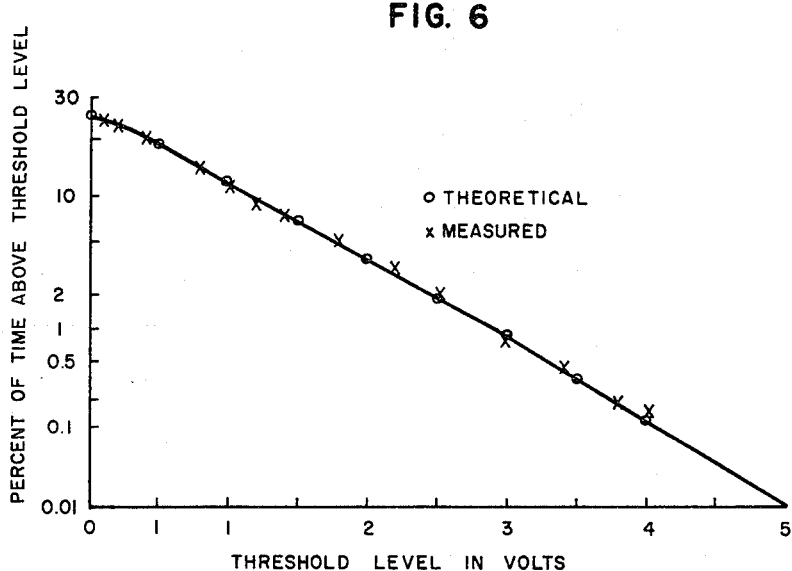

Therefore, it is an object of this invention to provide a simple method of accurately measuring the cumulative probability distribution of complex noise signals. It is a further object of this invention to provide the results in digital form requiring no further interpretation by the operator. Still another object of this invention is to provide a method of determining the percent modulation of modulated Gaussian noise signals. Other objects and a fuller understanding of the invention may be had by referring to the following description and claims, taken in conjunction with the accompanying drawings in which:

FIGURE 1 shows a block diagram of the entire system;
FIGURE 2 is a complete schematic diagram of the special circuitry required for the cumulative probability distribution measurement system;
FIGURE 3 is a graphical representation showing the sequence of events as a signal is processed;
FIGURE 4 is a graph showing the comparison of theoretical and measured cumulative probability distributions of Gaussian noise;
FIGURE 5 is a graph showing the comparison of theoretical and measured cumulative probability distributions of 100% square-wave modulated Gaussian noise;
FIGURE 6 is a graph showing a comparison of theoretical and measured cumulative probability distributions of 100% sine-wave modulated Gaussian noise;
FIGURE 7 is a graph showing the distribution fraction versus percent modulation for square-wave and sine-wave modulated Gaussian noise at the optimum threshold level.

Referring now to the figures and in particular to FIG. 1, there is shown a noise source 10 such as a hydrophone connected to a filter 12. The output of the filter 12 is connected to the threshold-set amplifier 16 or to modulator 14 and then to the threshold-set amplifier 16. The modulator 14 is required only when it is desired to modulate a noise source and compare the resulting probability distribution with the theoretical distribution. The modulator 14 would not be in the system when the cumulative probability distribution was being obtained for an unknown noise. In the latter case the output of filter 12 would be connected directly to the threshold-set amplifier 16.

The threshold amplifier 16 serves to establish the threshold level at which the noise is to be analyzed. At the output of threshold-set amplifier 16, a true R.M.S. reading is taken by R.M.S. meter 20 and the threshold level monitored meter 18. The signal is then transmitted to the Schmitt trigger 22. The purpose of this device is to generate a square-wave which has a duration exactly equal to the time that the noise signal remains above the threshold level. The output pulse of the Schmitt trigger is amplified by the square-wave amplifier 24 and this signal is fed to a gate circuit 28 that controls the output of a 100 kc. oscillator 26. The gate 28 functions by permitting the 100 kc. signal to pass through each time the Schmitt trigger 22 is activated. The 100 kc. signal is received from gate 28 by a counter 30 that is active for periods of one second. During the one-second period, the counter records all 100 kc. pulses that have passed through the gate 28. The counted pulses are then printed as a decimal number by a digital recorder 32 connected to a counter 30. The decimal number indicates the fraction of time that the noise signal remained above the threshold level. This procedure is carried out for several threshold levels and the plot of fraction of time versus threshold level represents the cumulative probability distribution for the particular complex noise signal under consideration.

FIGURE 2 shows in greater detail the special circuitry of FIG. 1 that was designed to operate in conjunction with several pieces of commercial electronic equipment. Terminals 1 and 2 receive the signal to be analyzed after it has been filtered to obtain the desired frequency spectrum. The noise signal enters the circuit at terminal 1. Resistors 34, 36, and 40 comprise a network that increases the stability of the D.C. amplifier 38 that is in the threshold-set portion of the analyzer. The gain of the amplifier 38 is maintained at 20 db. The network comprised of voltage-dividing resistors 34 and 40 and the negative-feedback resistor 36 reduces the overall gain to 12.9 db when the switch 42 is open and 10.5 db when switch 42 is closed. A negative-voltage source is obtained from the circuit of potentiometer 44 being in parallel with battery 46. The wiper arm of potentiometer 44 is used to select the level of the negative voltage which is applied to the input of the amplifier 38 through the switch 42. Since the Schmitt trigger fires only when its input signal exceeds 0 volt by a few millivolts, the amount of negative voltage applied to the input of amplifier 38 sets the threshold level that the incoming signal has to exceed before the Schmitt trigger conducts.

The signal leaving amplifier 38 is applied to the base of transistor 48 which is the input transistor for the Schmitt trigger 22. Transistor 48 is in a non-conducting or off condition and transistor 62 is conducting until the signal from amplifier 38 exceeds 0 volt at its output terminals by a few millivolts. At this time, transistor 48 conducts which in turn cuts off transistor 62. When transistor 62 is cut off, a positive-going pulse is generated since the current flow through load resistor 64 is drastically reduced and the voltage at the junction of the collector of transistor 62 and load resistor 64 rises to the collector battery-voltage level.

The positive-going pulse at the output of transistor 62 is coupled to the input of the square-wave amplifier 24 through the coupling capacitor 70. The pulse is amplified by transistor 74 and appears as an amplified negative-going pulse at the base of transistor 84 connected to transistor 74 through condenser 80. The negative pulse is further amplified by transistor 84 and appears as a positive-going pulse at the output of transistor 84. The positive pulse is D.C. coupled to the base of the emitter-follower transistor 90. The output of transistor 90 is still a positive pulse since there is no 180-degree phase shift through an emitter-follower circuit.

Transistor 102 coupled to transistor 90 through resistor 94, is a PNP transistor and is therefore kept in a state of conduction by the application of a negative bias by battery 100 through the decoupling resistor 98. Since transistor 102 is conducting when no positive signal appears on the base input, current is continually flowing from the oscillator whose input is through terminals 3 and 4. The conducting state in transistor 102 is such that all of the oscillator signal is dropped through the load resistor 96 and terminal 5 is essentially grounded. When the positive pulse is received through current-limiting resistor 94, transistor 102 is cut off, the current flow from the oscillator to ground is eliminated and the signal is allowed to flow unimpeded through the resistor 96 to the output terminal 5. The digital counter 30 is connected to terminals 5 and 6 to receive the gated 100 kc. signal. When the input-noise signal goes below the threshold level set by potentiometer 44 and battery 46, a similar but opposite reaction takes place in the circuitry culminating in transistor 62 acquiring a state of conduction; thus, an opposite-polarity pulse is generated, amplified, and used to put transistor 102 into a state of conduction. This action firmly grounds terminal 5 and no pulses are allowed to pass from the gate to the digital counter 30 connected to terminal 5.

In further explanation of the circuit, resistor 50, not mentioned in the preceding discussion, is the load resistor for transistor 48. Resistor 54 provides coupling from transistor 48 to transistor 62 and capacitor 52 enhances the rise time of the pulse from transistor 48 to transistor 62. Resistor 60 is a part of the potential divider network composed of resistors 50, 54, and 60. The potential divider network provides a positive voltage to the base of transistor 62 to keep it conducting when the Schmitt trigger 22 is in its quiescent state. Resistor 56 is an emitter resistor that is common to both transistors 48 and 62. When transistor 48 conducts, the voltage at the junction of resistor 56 and transistor 48 rises because of the resulting current flow. This rising voltage, being directly coupled to the emitter of transistor 62 works in conjunction with the negative-going voltage appearing at the base of transistor 62 to cause transistor 62 to cut off rapidly and to remain cut off until transistor 48 receives a negative-going signal that causes it to reverse state. Resistor 60 maintains the proper bias on the base of transistor 62 such that when the Schmitt trigger 22 is in its quiescent state, transistor 62 is conducting in a saturated condition.

Battery 66 maintains the proper collector potential on transistors 48, 62, 74, 84, and 90. Battery 68 maintains the proper emitter potential on transistors 74, 84, and 90. Potentiometer 58 in parallel with battery 68 provides a means of setting the Schmitt-trigger circuit 22 so that the trigger will fire only when the signal present at the base input of transistor 48 exceeds 0 volt by a few millivolts. The input voltage to transistor 48 is referenced against ground such as terminals 2, 4, and 6. The setting of the Schmitt trigger 22 is determined by the use of a calibrating sine-wave input signal to the system. Resistors 76 and 86 are collector load resistors for the square-wave amplifier and resistors 78, 88, and 92 are emitter resistors for transistors 74, 84, and 90. Resistors 72 and 82 are base-bias resistors for transistors 74 and 84 and capacitor 80 is the coupling capacitor between transistors 74 and 84.

Referring now to FIG. 3, the waveforms graphically pictured show the sequence of events at the terminals of the indicated elements which occur during a very short period of time. Time is plotted on the abscissa and voltage is plotted on the ordinate.

The top line shows a sample of random noise as it is seen by the amplifier 38. The line marked $V_t$ is the threshold level selected by the operator.

The second line shows the positive part of the noise signal after leaving the amplifier 38 where the base line has been raised by an applied D.C. bias at the input. This output is now applied to the input of the Schmitt trigger 22 which generates a square wave as shown in line 3. When the amplitude of the noise goes above the threshold the Schmitt trigger 22 begins to conduct. As the amplitude of the noise goes below the threshold, the trigger ceases to conduct. The resulting output is a square wave which has a duration equal to the time between ascending and descending threshold crossings of the noise.

Line 4 merely shows the square wave after amplification. This is made necessary because the Schmitt trigger 22 was designed to produce minimum hysteresis and, as a result, the output of the trigger is small in magnitude. Since a gate 28 of the type shown in FIG. 2 requires more voltage to operate than is supplied by the Schmitt trigger, it was necessary to include a square-wave amplifier 24 in this embodiment.

Line 5 shows the action of the gate 28 as influenced by the output of the square-wave amplifier 24. During quiescence, the gate 28 acts as a short to ground for the oscillator 26. When the output of the amplifier 24 rises to the necessary voltage the gate 28 becomes a high impedance device. This results in the oscillator output flowing into the counter 30 as is shown in line 6. The counter 30 counts each cycle of output from the oscillator 26 for a period of one second. The number of counts is then displayed as a number. This number gives the cumulative probability distribution at a particular threshold level, $V_t$. The number of cycles counted during the one second period is a numeric which in conjunction with numerics obtained at other threshold levels, can be used to determine the cumulative probability distribution of the noise signal being analyzed. By proper selection of commercial support equipment and careful design of the special circuitry, the total cumulative rise time from Schmitt trigger 22 input to gate 28 output can be held to about three microseconds.

Referring now to FIG. 4, there is shown a graph which illustrates the relationship between the threshold level in volts and the percent of time that an unmodulated Gaussian noise remains above the threshold level. The theoretical values are indicated by a circle and the measured values indicated by an x. The instantaneous amplitude of Gaussian noise has, by definition, a probability density, $p(v)$, given by $$p(v) = \frac{1}{\sqrt{2\pi\sigma^2}} e^{-\frac{(v-u)^2}{2\sigma^2}} \quad (1)$$

where $p(v)$ = probability density function
$v$ = voltage amplitude
$\sigma$ = standard deviation from the mean
$u$ = mean value
$\sigma$ = is further defined as the root-mean-square deviation from the mean.

The mean, $u$, of noise is known to be zero, thus $$p(v) = \frac{1}{\sqrt{2\pi\sigma^2}} e^{-\frac{(v-u)^2}{2\sigma^2}} \quad (2)$$

reduces to $$p(v) = \frac{1}{\sqrt{2\pi\sigma^2}} e^{-\frac{v^2}{2\sigma^2}} \quad (3)$$

$v_t$. This is known as the cumulatvie probability distribu- noise signal will exceed various selected threshold levels, $v_t$. This is known as the cumulative probability distribution, and is given by $$P(v_t) = \int_{v_t}^{\infty} p(v) dv \quad (4)$$

The theoretical values shown in FIG. 4 were computed from the above formula where $p(v)$ is the probability density function for Gaussian noise.

As can be seen from the graph of FIG. 4, the measured values agree very closely with the theoretical values indicating the high degree of accuracy with which the system operates.

FIGURE 5 is another graph similar to that of FIG. 4, except that it refers to 100% square-wave modulated Gaussian noise. The threshold level in volts is plotted along the abscissa and the percent of time that the signal remains above the threshold is plotted along the ordinate.

The computation of the theoretical values for 1-volt R.M.S. Gaussian noise that is amplitude modulated by a square wave, is similar to that for the unmodulated Gaussian noise, in that $$p(v) = \frac{1}{\sqrt{2\pi}(1 \pm m)} e^{-\frac{v^2}{2(1 \pm m)^2}} \quad (5)$$

where $\sigma$ now equals $(1 \pm m)$, and $m$ is the fraction of full modulation, $100m$ being the percent modulation. The $+$ sign is taken for the upper modulation level and the $-$ sign is taken for the lower modulation level.

Since the amplitude of the envelope is at each modulation level one half of the time, the probability density of the complete signal is given by $$p(v) = \frac{1}{2}\left[\frac{1}{\sqrt{2\pi}(1+m)} e^{-\frac{v^2}{2(1+m)^2}} + \frac{1}{\sqrt{2\pi}(1-m)} e^{-\frac{v^2}{2(1-m)^2}}\right]$$

Since there are two terms in the integrand of Equation 6 that could add up to 1, it is necessary to divide the results by 2 to retain the correct normalization. This satisfies the theoretical requirement of a probability density since, by definition, $$\int_{-\infty}^{\infty} p(v) dv \equiv 1 \quad (7)$$

Power in a square-wave-modulated carrier is increased by a factor of $(1+m^2)$ but the measurements were taken with an amplitude (voltage) modulated signal, the power of which had to be normalized to 1. The probability density for a normalized signal with a threshold level, $v_t$, is equal to that for a threshold of $v_t\sqrt{1+m^2}$ with the non-normalized signal having an R.M.S. value of $1+m^2$. Therefore, the computation for the square-wave-modulated non-normalized signal will be accomplished by $$P(v_t)_{\text{normalized}} = P(v_t\sqrt{1+m^2})_{\text{non-normalized}} = \int_{v_t}^{\infty} \frac{p(v) dv}{\sqrt{1+m^2}} \quad (8)$$

Thus, the threshold level is increased to compensate for the power normalization.

FIGURE 6 is a graph that refers to 100% sine-wave-modulated Gaussian noise. As in FIGS. 4 and 5, the threshold level in volts is plotted along the abscissa and the percent of time that the signal remains above the threshold level is plotted along the ordinate. The theoretical values are indicated by a circle and the measured values indicated by an x.

For sine-wave-modulated Gaussian noise, the probability density for a particular value of $\theta$ becomes $$p(v) = \frac{1}{\sqrt{2\pi}(1+m\sin\theta)^2} e^{-\frac{v^2}{2(1+m\sin\theta)^2}} \quad (9)$$

where $\sigma$ now equals $(1+m\sin\theta)$.

The probability distribution of the complete signal may be computed by numerical integration in 10 degree steps. Thus, $$P(v_t) = \sum_{\theta=10}^{366} \frac{1}{36} \int_b^{\infty} \frac{1}{\sqrt{2\pi}(1+m\sin\theta)^2} e^{-\frac{v^2}{2(1+m\sin\theta)^2}} dv \quad (10)$$

where $$b = v_t\sqrt{1+m^2/2}$$

The term, $b$, increases the threshold level in Equation 10 to compensate for the power normalization, as in the square-wave-modulated case, Equation 8. The normalization is $\sqrt{1+m^2/2}$ for the sine-wave-modulated case however.

FIGURE 7 is a plot of distribution fraction versus percent modulation for a 1-volt R.M.S. square-wave- and 1-volt R.M.S. sine-wave-modulated Gaussian noise. The term distribution fraction is defined as the fraction of the time that the signal exceeds the optimum threshold level of 0.5 volt. The corresponding averaged standard deviations for the optimum threshold level of 0.5 volt are plotted vertically at two modulation percentages on each curve. A spread of two standard deviations was taken as the desired reliability and corresponds to a reliability of 95.5%.

To determine the accuracy of measurement for a reliability of 95.5%, it is necessary to draw horizontal lines to connect the extreme ends of the vertical $\sigma$ line to the corresponding modulation distribution curve. For example, at the 60% modulation point of the sine-wave-modulation curve a vertical line is drawn two $\sigma$ above and two $\sigma$ below in length. The horizontal line drawn at the ends intercepts the distribution curve at 55.5% and 64.5%. This indicates that the percent modulation of a 1-volt R.M.S. sine-wave-modulated Gaussian noise signal can be measured to an accuracy of ±4.5% modulation with a reliability of 95.5% at this position of the curve. Drawing the vertical line only one $\sigma$ above and below the distribution curve will decrease the percent modulation spread with a corresponding decrease in reliability.

If the reliability procedure is carried out for another point along the distribution curve the accuracy is seen to differ because of the difference in slope and curvature of the curve. For instance, at the 33.3% modulation point for the sine-wave-modulation distribution curve, the accuracy turns out to have a modulation spread of from 7.5% left of the vertical line to 6.5% to the right of the line, for a reliability of 95.5%.

This work was carried out using noise with a bandwidth of 1 kc. and sample measurement times of 1 second. The reliability with which the percent modulation can be measured is a function of the bandwidth-time product, WT, of the noise which in the present case was 1000; thus the results apply only to noise of this WT value. The accuracy of the measurements of the standard deviation is a function of the number of distribution samples taken at each threshold level. This study incorporated 20 distribution samples per threshold level throughout the entire series of measurements.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed:

What is claimed is:
1. The method of measuring the percent modulation of a noise signal within a predetermined frequency band, said signal having a predetermined type of modulation, comprising:
   (a) generating a curve representative of the relationship between percent modulation and cumulative probability distribution for said type of modulation;
   (b) passing said signal through an electronic circuit to produce a numerical reading characteristic of the cumulative probability distribution thereof; and
   (c) comparing said numerical reading obtained from said signal with said curve to obtain the percent modulation corresponding thereto.

2. The method of identification of an unknown random noise source which includes a signal within a predetermined frequency band, said signal having a predetermined type of modulation, comprising:
   (a) obtaining a curve representative of the relationship between percentage modulation and cumulative probability distribution by,
      generating a noise source which includes frequencies within said predetermined frequency band,
      filtering said noise source to eliminate all frequencies other than said predetermined frequency band, the frequencies within said predetermined frequency band constituting a calibration signal,
      modulating said calibration signal to produce a predetermined type of modulation,
      while said predetermined type of modulation is maintained, varying the percentage modulation of said calibration signal at sufficient separate levels of different percent modulation to plot a significantly accurate curve between 0 percent modulation and 100 percent modulation,
      while maintaining each of said levels of different percent modulation, passing said modulated calibration signal through an electronic circuit to produce a numerical reading characteristic of the cumulative probability distribution for that level,
      plotting a graphical representation illustrating the relationship between the percentage modulation and the cumulative probability distribution;
   (b) filtering said random noise source to eliminate all frequencies other than said predetermined frequency band,
      passing said predetermined frequency band obtained from said random noise source through said electronic circuit to produce a numerical reading characteristic of the cumulative probability distribution; and
   (c) comparing said numerical reading obtained from said random noise source with said graphic representation to obtain the percent modulation corresponding therewith, thereby identifying said predetermined frequency band portion of said random noise source.

References Cited by the Examiner

UNITED STATES PATENTS

| | | | |
|---|---|---|---|
| 2,263,519 | 11/1941 | Ritzmann | 340—15.5 |
| 2,752,589 | 6/1956 | DeLong. | |
| 2,779,869 | 1/1957 | Gerks | 340—15.5 |

BENJAMIN A. BORCHELT, *Primary Examiner.*

W. KUJAWA, *Assistant Examiner.*